Patented Oct. 17, 1950

2,526,614

UNITED STATES PATENT OFFICE 2,526,614

DENTIFRICE COMPOSITION

George P. Butterfield, Des Plaines, Ill., assignor, by mesne assignments, to Amion, Inc., Chicago, Ill., a corporation of Illinois No Drawing. Application January 31, 1947, Serial No. 725,748

5 Claims. (Cl. 167—93)

This invention relates to a topical preparation, and more particularly to a preparation comprising a dry mixture of urea, urease or a substance furnishing urease, and a carrier. In the presence of moisture, the urea is slowly hydrolyzed under the enzymatic action of the urease to form ammonium carbonate, which further breaks down to produce ammonia. When the preparation is applied topically to the cavities or the surfaces of the human body, as for instance to the oral cavity or to the skin, the moisture present makes possible the enzymatic action referred to, with the liberation of ammonia. The action of the ammonia and residual urea is bactericidal and antienzymatic to acidogenic organisms, such as Lactobacillus acidophilus, with the result that such bacteria, as well as yeast cells, are largely destroyed. In addition, the products of the enzymatic reaction act to prevent any acidogenic organisms present from producing lactic acid.

Lactobacillus acidophilus and yeast organisms are generally present in great numbers in the saliva of all persons, both children and adults, who have active dental caries. Lactobacillus acidophilus metabolizes glucose, lactose and other sugars into products essential to the growth of such bacteria and also into end products such as lactic acid. Where Lactobacillus acidophilus flourish in the mouth, the pH of the saliva is almost always markedly changed from the normal value by the presence of the lactic acid produced by the bacteria. As a consequence, a decidedly acid condition prevails, particularly on the tooth enamel and under the mucin plaques. It is a generally accepted fact that lactic acid brings about the erosion or dissolution of the tooth enamel and thus paves the way for the development of the organisms which cause tooth decay.

While various alkaline and detergent substances may be introduced into the mouth in the form of rinses, pastes, powders and gums, such substances will not inhibit the growth or activity of acidogenic organisms in causing the breaking down of sugars into lactic acid. Moreover, substances such as sugars and starches, which latter are converted within the mouth into sugars, and phosphates, which have been established to be stimulative of bacterial growth, may be introduced along with the alkaline and detergent materials. These substances foster the growth of Lactobacillus acidophilus and yeasts. The preparation of my invention, on the other hand, is of such a nature that only bactericidal substances are introduced or produced when the preparation is applied within the oral cavity or upon the skin.

In one form of my invention, the ingredients mentioned above are incorporated into a dentifrice, in the form of a dry powder. When so used, the full enzymatic reaction occurs only slowly and over a long period of time. Consequently, if such a dentifrice is used twice a day or oftener, it will maintain a condition such that Lactobacillus acidophilus and yeast cells will be prevented from flourishing and the production of lactic acid will also be inhibited. In vitro tests using standard bacteriological methods demonstrate that within twenty-four hours after beginning the use of a dentifrice embodying my invention, Lactobacillus acidophilus completely disappear or are markedly reduced in numbers within the area treated. In vivo use shows continuous marked reduction in the growth of Lactobacillus acidophilus and also in a stoppage of lactic acid production during the use of the dentifrice in the usual way.

Within the mouth of the normal non-carious individual, sufficient ammonia is present at all times to dissolve the mucin that is normally present in saliva and therefore to prevent the formation of mucin into plaques upon the tooth surfaces. Where the natural protective enzyme systems have been destroyed through lowering of the pH by the activity of acidogenic organisms, mucin plaques form upon the teeth and protect and promote the growth of colonies of bacteria which lie beneath them, and also confine the acid medium necessary to the growth and development of the acidogenic organisms beneath such plaques. The topical application of my preparation produces enough ammonia to dissolve the mucin plaques and by its continuing action mucin plaques are prevented from reforming.

It is therefore an important object of this invention to provide a topical preparation which, in the presence of naturally occurring moisture in the human oral cavity and on the skin, will produce residual and reaction products that act to destroy Lactobacillus acidophilus and yeast cells and to prevent acidogenic organisms that may be present from producing lactic acid.

It is a further important object of this invention to provide a topical preparation which, when used in the oral cavity as a dentifrice, rinse, chewing gum or the like, will serve to activate protective enzyme systems in the mouth, which might have become inactivated through an unfavorable hydrogen-ion concentration in the saliva brought about by acidogenic bacteria and yeast.

It is a still further important object of this invention to provide a dentifrice comprising urea and urease, capable of reacting in the presence of moisture in the oral cavity to liberate ammonia, which functions to dissolve mucin plaques from the teeth and to prevent the reforming of such plaques.

Other and further important objects of this invention will become apparent from the following description and appended claims.

The preparation of my invention comprises urea, also known as carbamide and carbonyldiamide, and urease or a substance capable of furnishing urease. Crystalline urease may be used, or jack bean meal, watermelon seed meal, soy bean meal or other urease bearing meals may be employed. Where the preparation is to be used in the form of a dentifrice, the urea and urease, or urease-bearing meal, may be suitably mixed with the usual dry dentifrice ingredients, such as precipitated calcium carbonate, together with the usual sweetening and flavoring agents. Bentonite may optionally be used in the preparation. In place of calcium carbonate, magnesium or barium carbonate, or sodium carbonate may be employed.

The following formula will serve to indicate the preferred percentages, by weight, of the active ingredients in my topical preparation:

|  | Per cent |
| --- | --- |
| Urea | 10 to 30 |
| Urease (or an equivalent amount of urease-containing meal) | 0.0006 to 0.0024 |

The chemical mechanism of the active ingredients is this: when the carbamide and urease are brought into the presence of moisture, such as saliva in the mouth, hydrolysis of the urea occurs to form ammonium carbonate, which ultimately breaks down to ammonia, carbon dioxide and water as follows:

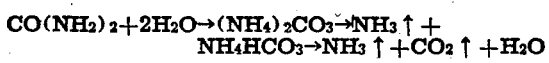

As originally made up for shipment or storage, the preparation if it includes all of the active ingredients, must be substantially moisture-free to prevent reaction between the urea and its enzyme before topical use. Heavy metals and quinones are poisonous to urease and must be carefully excluded. Consequently, great care must be exercised in preparing and handling the composition.

When the active ingredients are incorporated into a dentifrice, the balance of the composition is made up of calcium carbonate, or magnesium carbonate, as the carrier and cleansing agent, and any other desired constituent of the dentifrice. Bentonite, for instance, is a well known non-abrasive cleansing agent that may be incorporated into the dentifrice composition. Such sweetening and flavoring agents are added as will mask the chemical taste of the ingredients and leave the desired fresh taste in the mouth without in any way interfering with the desired reaction. Saccharin is an example of a suitable sweetening agent, and oil of peppermint is an example of a suitable flavoring agent. Menthol may be incorporated into the dentifrice for its "cooling" effect.

While the art of releasing ammonia from urea in the presence of its enzyme, urease, is well known, it has never, to the best of my knowledge, heretofore been applied to a therapeutic use. The application of the principle to a dentifrice presents several problems. First urea in concentrations of over 30% by weight of the preparation is irritating to the mucus membrane and, furthermore, injurious to all the enzyme systems in the mouth. I have found a percentage of 15 to 30% by weight an optimum one for the reaction desired from my preparation. Furthermore, since the reaction would be too rapid if only urea and crystalline urease were present, it is necessary so to select the ingredients of the mixture that the reaction proceeds at an optimum rate. Inasmuch as crystalline urease is rather difficult to handle, I prefer to use one of the meals containing substantial amounts of urease for my source of the enzymes. While jack bean meal is preferred, the meal of soy beans, watermelon seeds or other urease-containing material can be used satisfactorily. The equivalent amounts of jack bean meal corresponding with the range of 0.0002 to 0.0024 part by weight of urease are approximately from 0.5 to 2.0 parts by weight of jack bean meal.

Where a carbonate, such as calcium carbonate, is the carrier, the calcium carbonate also functions to retard the speed of the enzymatic reaction, while at the same time being compatible with the function of such reaction. Where the preparation is used as a dentifrice and the saliva of the mouth happens to have a relatively high acidity, such, for instance, as an acidity represented by a pH value numerically less than 6, the carbonate serves to neutralize the excessive acidity and adjust the pH to a more favorable range, in the neighborhood of a pH of 6.5 to 7.5, for the reaction to take place. If the dentifrice is held in the mouth for 1 to 10 minutes, it will impart to the saliva of the mouth a pH of 7.3 up to 7.6 and the saliva will remain on the alkaline side for 1 to 4 hours. Additionally, if desired, buffers may be incorporated into the topical preparation, such as the citrates or acetates, to keep the pH at around the neutral point of 7.

Although my preparation has been described particularly in connection with its use as a dentifrice, it may also be used as a rinse, or with a non-hydrous gum vehicle as a chewing gum. In any of these forms, the mixture, in the presence of water, reacts to liberate ammonia, which in combination with the excess of urea present, completely stops lactic acid production, reduces the actual number of acidogenic organisms, reactivates normal beneficial enzyme systems in the mouth, and dissolves mucin plaques and prevents the reformation of such mucin plaques. These functions are not capable of being performed by the use of ammonium carbonate or of urea alone.

Instead of incorporating both the urea and urease in the dentifrice itself, the urease alone may be incorporated in the dentifrice and the urea used in water solution as a rinse following the application of the dentifrice. The reaction between the urea and urease then occurs in the mouth, as above described.

It will, of course, be understood that various details of the process may be varied through a wide range without departing from the principles of this invention and it is, therefore, not the purpose to limit the patent granted hereon otherwise than necessitated by the scope of the appended claims.

I claim as my invention:

1. A topical preparation having an anti-enzymatic activity toward acidogenic organisms of the lactobacilli type, comprising a dry mixture capable of reacting with moisture in the presence of *Lactobacillus acidophilus* to liberate ammonia, said mixture containing urea, a urease-containing substance and a carrier therefor compatible with the urea-urease function of liberating ammonia in the presence of moisture, said urea being present in an amount not over 30% by weight of said mixtures.

2. A dentifrice having an anti-enzymatic activity toward acidogenic organisms present in caries-producing saliva, comprising a dry mixture capable of reacting with moisture in the presence of *Lactobacillus acidophilus* to liberate free ammonia, said mixture having the following composition: :

| | Per cent |
|---|---|
| Urea | 10–30 |
| Urease | 0.0006–0.0024 |
| Tooth cleansing powder | 70–90 |

3. A dentifrice having an anti-enzymatic activity toward acidogenic organisms present in caries-producing saliva comprising a dry mixture of 10 to 30% by weight urea, an amount of a urease-containing substance equivalent to from 0.0006 to 0.0024% by weight crystalline urease, and from 70 to 90% of a dry tooth cleansing powder containing calcium carbonate, said mixture being capable of reacting with moisture in the presence of *Lactobacillus acidophilus* to liberate free ammonia.

4. A dentifrice for reducing the acidity of caries-producing saliva which comprises a dry mixture having the following composition:

| | Per cent |
|---|---|
| Urea | 10–30 |
| Urease | 0.0006–0.0024 |
| Basic carbonate | 70–90 | said basic carbonate being compatible with the urea-urease function of liberating ammonia in the presence of moisture and functioning to control the reaction rate of the urea-urease mixture and water, the ammonia and the basic carbonate coacting to neutralize excessive acidity of the saliva.

5. A dentifrice composition consisting essentially of urea and urease in admixture as the active ingredients, said composition being sufficiently free of moisture to render the same storage-stable but being capable upon use in the presence of free moisture of liberating ammonia as a result of the splitting of said urea by said urease.

GEORGE P. BUTTERFIELD.

REFERENCES CITED

The following references are of record in the file of this patent:

UNITED STATES PATENTS

| Number | Name | Date |
|---|---|---|
| 1,492,299 | Kyle | Apr. 29, 1924 |
| 1,566,218 | LeLand | Dec. 15, 1925 |
| 1,717,723 | McCall | June 18, 1929 |

OTHER REFERENCES

Stephan: "Science," vol. 92, pages 578 and 579 as per paper #4 (1940).

Science News Letter, Feb. 23, 1946, page 117: "Preventing Tooth Decay."

Grove et al., The Dental Cosmos, vol. 76, Oct. 1933, pages 1029–1036: "The Biochemical Aspect of Dental Caries."